(12) United States Patent
Nagae

(10) Patent No.: US 6,241,891 B1
(45) Date of Patent: *Jun. 5, 2001

(54) METHOD OF USING STATIONARY PHASE IN REVERSED PHASE CHROMATOGRAPHY, AND REVERSED PHASE CHROMATOGRAPH APPARATUS COMPRISING STATIONARY PHASE

(75) Inventor: Norikazu Nagae, Seto (JP)

(73) Assignee: Nomura Chemical Co., Ltd., Seto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/399,736

(22) Filed: Sep. 20, 1999

(30) Foreign Application Priority Data

Dec. 24, 1998 (JP) .................................. 10-367043

(51) Int. Cl.$^7$ .................................................. B01D 15/08
(52) U.S. Cl. ...................... 210/635; 210/656; 210/198.2; 210/502.1
(58) Field of Search ..................... 210/635, 656, 210/198.2, 502.1

(56) References Cited

U.S. PATENT DOCUMENTS

| | | | |
|---|---|---|---|
| 4,324,689 | * 4/1982 | Shah | 210/656 |
| 4,732,977 | * 3/1988 | Kim | 540/350 |
| 4,920,152 | * 4/1990 | Regnier | 210/656 |
| 5,037,795 | * 8/1991 | Wieserman | 210/635 |
| 5,154,822 | * 10/1992 | Simpson | 210/635 |
| 5,344,767 | * 9/1994 | Boullais | 435/106 |
| 5,475,094 | * 12/1995 | Vertesy | 536/17.1 |
| 5,647,979 | * 7/1997 | Liao | 210/635 |
| 5,811,581 | * 9/1998 | Piva | 210/635 |
| 6,056,877 | * 5/2000 | Gjerde | 210/635 |
| 6,066,258 | * 5/2000 | Gjerde | 210/635 |

OTHER PUBLICATIONS

Snyder, Introduction to Modern Liquid Chromatography John Wiley & Sons, Inc., 1979, pp. 270–294.*

* cited by examiner

Primary Examiner—Ernest G. Therkorn
(74) Attorney, Agent, or Firm—Oliff & Berridge, PLC

(57) ABSTRACT

A method of using, in a reversed phase chromatography, a stationary phase including, as a main component thereof, an alkyl group having not less than 24 carbon atoms, with a mobile phase including water as a main component thereof. A reversed phase chromatograph apparatus for separating a water soluble compound, including a mobile phase comprising water as a main component thereof, and a stationary phase including, as a main component thereof, an alkyl group having not less than 24 carbon atoms.

5 Claims, 7 Drawing Sheets

CONDITIONS
   COLUMN(ODS): 4.6 × 250 mm
   MOBILE PHASE: $H_2O$
   FLOW RATE: 1.0 ml/min
   DETECTION: UV 254 nm
   TEMPERATURE: 40 °C SAMPLE:  1. CYTOSINE
             2. URASIL
             3. CYTIDINE
             4. URIDINE
             5. THYMINE CONDITIONS
  COLUMN(TRIMETHYLSILYL GROUP):
    4.6 × 250 mm
  MOBILE PHASE: $H_2O$
  FLOW RATE: 1.0 ml/min
  DETECTION: UV 254 nm
  TEMPERATURE: 40 °C SAMPLE:  1. CYTOSINE
         2. URASIL
         3. CYTIDINE
         4. URIDINE
         5. THYMINE

METHOD OF USING STATIONARY PHASE IN REVERSED PHASE CHROMATOGRAPHY, AND REVERSED PHASE CHROMATOGRAPH APPARATUS COMPRISING STATIONARY PHASE

BACKGROUND OF THE INVENTION

1. Field of the Invention

The present invention relates to a method of using, in a reversed phase chromatography, a stationary phase comprising an alkyl group as a main component thereof, with a mobile phase comprising water as a main component thereof, and also relates to a reversed phase chromatograph apparatus comprising a stationary phase comprising an alkyl group as a main component thereof and a mobile phase comprising water as a main component thereof.

2. Related Art Statement

There are known a reversed phase chromatography in which water is used as a main component of a mobile phase as a solvent for dissolving a sample including a water soluble compound to be separated, and a non-polar compound is used as a main component of a liquid or solid stationary phase supported by a solid support filled in a column, and a reversed phase chromatograph apparatus comprising the mobile phase and the stationary phase. In view of hydrophobicity and compound-retention capacity, an alkyl group having 8 carbon atoms (octyl group) to 18 carbon atoms (octadecyl group; hereinafter, referred to as the "ODS") has been widely used as the stationary phase.

However, in the case where an alkyl group having 8 to 18 carbon atoms is used as the stationary phase, if 100% of water is used as the mobile phase for the purpose of separating a water soluble compound, a time-wise change occurs that the sample-retention or compound-retention time between the time when a sample is injected into the column and the time when the compound is detected under the column gradually decreases. FIG. 1 shows three chromatograms for illustrating a time-wise change that was observed when an identical sample is used at three different times, each for separating five sorts of compounds. The ODS (octadecyl group) is used as the stationary phase, and 100% of water is used as the mobile phase. The three chromatograms of FIG. 1 prove that as time passes, the compound-retention time of the column, i.e., the stationary phase gradually decreases, which leads to an incomplete separation of the compound. Thus, in the case where 100% of water is used as the mobile phase, the ODS cannot be used as the stationary phase. It is thought that the above time-wise change would result from the "slipping" phenomenon that as the 100% water mobile phase iteratively passes through the column, the carbon chains (ligands) gradually lie on their sides, as illustrated in FIG. 2, and the interaction between the stationary phase and the mobile phase gradually decreases.

For preventing the above time-wise change, it has been proposed to use, as the stationary phase, an alkyl group having a smaller number of carbon atoms that is physically thought to less likely lie on its side. FIG. 3 shows three chromatograms in which trimethylsilyl group is used as the stationary phase, 100% water is used as the mobile phase, and the same sample as used in those shown in FIG. 1 is used at three different times. The three chromatograms of FIG. 3 prove that the compound-retention time of trimethylsilyl group used as the stationary phase does not decrease even though it may be used for a long time. It has also been proved that in the case where phenyl group is used as the stationary phase, its compound-retention time does not decrease. Those proofs also support that the above time-wise decrease in the compound-retention time of the alkyl group having 8 to 18 carbon atoms used as the stationary phase results from the "slipping" phenomenon.

However, in the case where an alkyl group having a small number of carbon atoms is used as the stationary phase, the stationary phase cannot completely separate different isomers from each other, because the alkyl group has only a poor steric selectivity. In addition, since the alkyl group has only a low hydrophobicity, it cannot sufficiently separate certain compounds from samples. Meanwhile, a stationary phase in which ODS is bonded at a lower density to the solid support and trimethylsilyl group is additionally bonded with the solid support, has been developed. This stationary phase enjoys the advantage of excellent compound-retention capacity of ODS and the advantage of trimethylsilyl group that a solution including water as a main component can be used as the mobile phase. This stationary phase has solved the problem of the time-wise decrease of compound-retention time to some degree, but not a satisfactory degree. In addition, since the amount of trimethylsilyl group is more, i.e., the amount of long alkyl group is less, the hydrophobicity of this stationary phase is lower than that of the prior stationary phase in which only the long alkyl group is used. Thus, this stationary phase suffers from the problems of low compound-retention capacity, insufficient compound-separate capability, and low steric selectivity.

SUMMARY OF THE INVENTION

It is therefore an object of the present invention to provide a method of using, in a reversed phase chromatography, a stationary phase exhibiting a high hydrophobicity and a great compound-retention capacity, with a mobile phase comprising water as a main component thereof.

It is another object of the present invention to provide a reversed phase chromatograph apparatus comprising a stationary phase exhibiting a high hydrophobicity and a great compound-retention capacity, and a mobile phase comprising water as a main component thereof.

In the above-indicated background, the Inventor has performed various studies and has found that in the case where an alkyl group having a greater number of carbon atoms than that of the alkyl group whose compound-retention time time-wise decreases is used as the stationary phase and a solution including water as its main component is used as the mobile phase, the compound-retention time of the stationary phase does not time-wise decrease. As indicated above, it has been thought that the time-wise decrease of compound-retention time of the stationary phase would result from the "slipping" phenomenon that the carbon chains time-wise lie on their sides because of their hydrophobicity. Accordingly, it has also been thought that even though an alkyl group having a greater number of carbon atoms may be used as the stationary phase, with the mobile phase including water as its main component, the "slipping" phenomenon would naturally occur because the carbon chains time-wise lie on their slides and accordingly the compound-retention time of the stationary phase would time-wise decrease. In fact, however, no time-wise decrease of the compound-retention time of the stationary phase occurs. The present invention has been developed based on this finding.

The present invention provides a reversed-phase-chromatography stationary-phase using method and a reversed phase chromatograph apparatus which have one or more of the technical features that are described below in respective paragraphs given parenthesized sequential numbers (1) to (17). Any technical feature which includes another technical feature shall do so by referring, at the beginning, to the parenthesized sequential number given to that technical feature.

(1) According to a first feature of the present invention, there is provided a method of using, in a reversed phase chromatography, a stationary phase comprising, as a main component thereof, an alkyl group having not less than 24 carbon atoms, with a mobile phase comprising water as a main component thereof. In the present chromatograph method, the compound-retention time of the stationary phase does not change as time passes. The alkyl group having 24 or more carbon atoms as the main component of the stationary phase has great hydrophobicity and steric selectivity that have not been available from a conventional stationary phase which is used with a mobile phase comprising water as its main component. Thus, the present method enjoys a great compound-retention ability or capacity, and accordingly can easily separate a certain compound from a sample, or separate different isomers from each other, though it has been impossible for the conventional method to do so.

(2) According to a second feature of the present invention that includes the first feature (1), the stationary phase comprises, as the main component thereof, an alkyl group having from 24 carbon atoms (tetracosyl group) to 40 carbon atoms (tetracontyl group). In this case, the stationary phase is advantageously supported by pores of the solid support. Thus, the present method enjoys a high column efficiency. An alkyl group having more than 40 carbon atoms is too big to fit in the pores of the solid support.

(3) According to a third feature of the present invention that includes the first or second feature (1) or (2), the mobile phase consists essentially of water. The mobile phase may consist of water only, i.e., 100% of water. In this case, the mobile phase or liquid can be easily prepared. However, the mobile phase may comprise 99%, 98%, or 97% of water.

(4) According to a fourth feature of the present invention that includes any one of the first to third features (1) to (3), the method further comprises a step of bonding trimethylsilyl group to an active group which remains on a surface of a solid support which supports the stationary phase, the active group being not bonded with the alkyl group of the stationary phase. In this case, a column which is filled with the solid support can enjoy a long life expectancy. In addition, the column can be produced at low cost. Thus, the present chromatograph method can be performed at low cost. By the way, there has been proposed a column which is filled with a stationary phase comprising, as its main component, an alkyl group having 8 to 18 carbon atoms, and which is used with a mobile phase comprising water as its main component. In this column, however, an active group which remains on a surface of a solid support is treated with a hydrophilic compound as an end-capping agent. Thus, the surface of the solid support exhibits a high degree of polarity, thereby preventing the carbon chain of the alkyl group from lying on its side. Accordingly, the life expectancy of this column is not so high, in particular under an acidic condition, and the special treatment results in increasing the production cost of the column.

(5) According to a fifth feature of the present invention that includes any one of the first to fourth features (1) to (4), the stationary phase is used with the mobile phase in a temperature range of 30 to 50° C.

(6) According to a sixth feature of the present invention, there is provided a reversed phase chromatograph apparatus for separating a water soluble compound, comprising a mobile phase comprising water as a main component thereof, and a stationary phase comprising, as a main component thereof, an alkyl group having not less than 24 carbon atoms. In the present chromatograph apparatus, the compound-retention time of the stationary phase does not change as time passes. The alkyl group having 24 or more carbon atoms as the main component of the stationary phase has great hydrophobicity and steric selectivity that have not been available from a conventional stationary phase which is used with a mobile phase comprising water as its main component. Thus, the present apparatus enjoys a great compound-retention ability or capacity, and accordingly can easily separate a certain compound from a sample, or separate different isomers from each other, though it has been impossible for the conventional apparatus to do so.

(7) According to a seventh feature of the present invention that includes the sixth feature (6), the stationary phase comprises, as the main component thereof, an alkyl group having from 24 to 40 carbon atoms.

(8) According to an eighth feature of the present invention that includes the sixth or seventh feature (6) or (7), the mobile phase consists essentially of water.

(9) According to a ninth feature of the present invention that includes any one of the sixth to eighth features (6) to (8), the chromatograph apparatus further comprises a solid support which supports the stationary phase, the solid support having, on a surface thereof, an active group which is not bonded with the alkyl group of the stationary phase, the active group being bonded with trimethylsilyl group. In this case, a column which is filled with the solid support can enjoy a long life expectancy. In addition, the column can be produced at low cost. Thus, the present chromatograph apparatus can be produced at low cost.

(10) According to a tenth feature of the present invention that includes the ninth feature (9), the solid support comprises silica which has, on a surface thereof, a silanol group which is bonded with the alkyl group of the stationary phase.

(11) According to an eleventh feature of the present invention that includes any one of the sixth to tenth features (6) to (10), the stationary phase comprises not less than 60% by weight of the alkyl group.

(12) According to a twelfth feature of the present invention that includes any one of the sixth to tenth features (6) to (11), the stationary phase comprises not less than 80% by weight of the alkyl group.

(13) According to a thirteenth feature of the present invention that includes any one of the sixth to twelfth features (6) to (12), the stationary phase comprises not less than 80% by weight of triacontyl group and not more than 20% by weight of an alkyl group having 24 to 28 carbon atoms.

(14) According to a fourteenth feature of the present invention that includes any one of the sixth to thirteenth features (6) to (13), the stationary phase comprises, as the main component thereof, a straight alkyl group having not less than 24 carbon atoms.

(15) According to a fifteenth feature of the present invention that includes any one of the sixth to fourteenth features (6) to (14), the stationary phase comprises, as the main component thereof, a branched alkyl group having not less than 24 carbon atoms.

(16) According to a sixteenth feature of the present invention that includes any one of the sixth to fifteenth features (6) to (15), the mobile phase further comprises acetonitrile.

(17) According to a seventeenth feature of the present invention that includes any one of the sixth to sixteenth features (6) to (16), the mobile phase further comprises at least one salt selected from the group consisting of sodium phosphate, trifluoroacetic acid, triethylamine, and sodium perchlorate.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Hereinafter, there will be described a reversed phase chromatograph apparatus 10 embodying the present invention, by reference to FIGS. 4, 5, and 6. The chromatograph apparatus 10 is for analysis.

Figure 1:
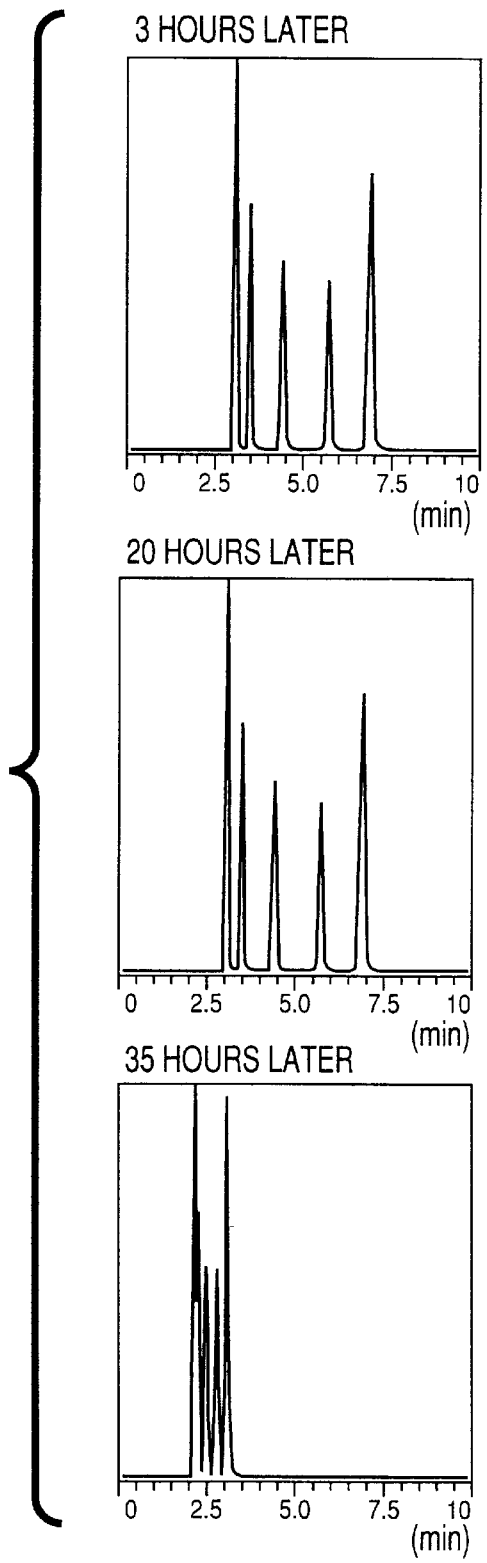
FIG. 1 shows three chromatograms which are obtained at three different times by a first conventional reversed phase chromatograph device in which 100% of water is used as its mobile phase and octadecyl group ("ODS") is used as its stationary phase, and which prove that the compound-separate capability of the chromatograph device time-wise changes.
Figure 2:
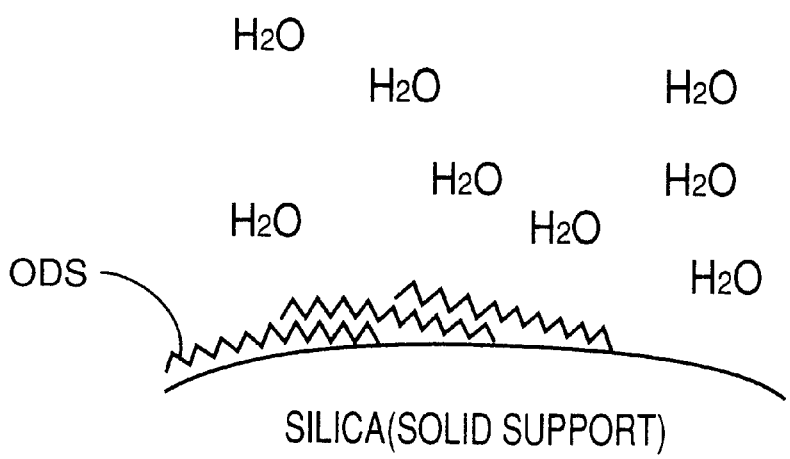
FIG. 2 is a view for illustrating the "slipping" phenomenon that is thought to occur to the conventional chromatograph device of FIG. 1.
Figure 3:
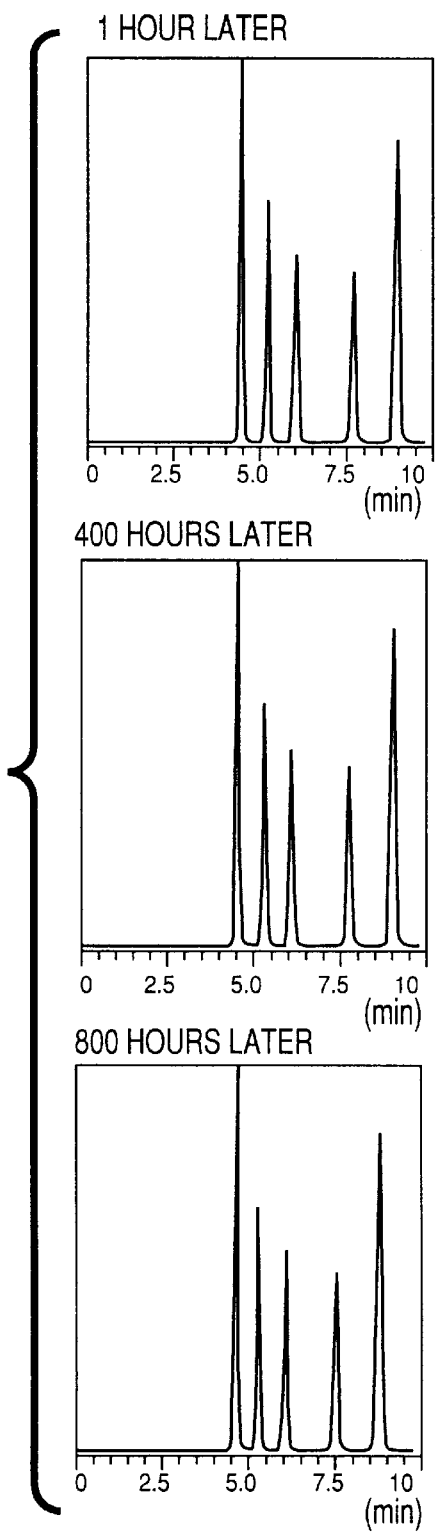
FIG. 3 shows three chromatograms which are obtained at three different times by a second conventional reversed phase chromatograph device in which 100% of water is used as its mobile phase and trimethylsilyl group is used as its stationary phase, and which prove that the compound-separate capability of the chromatograph device does not time-wise change.
Figure 4:
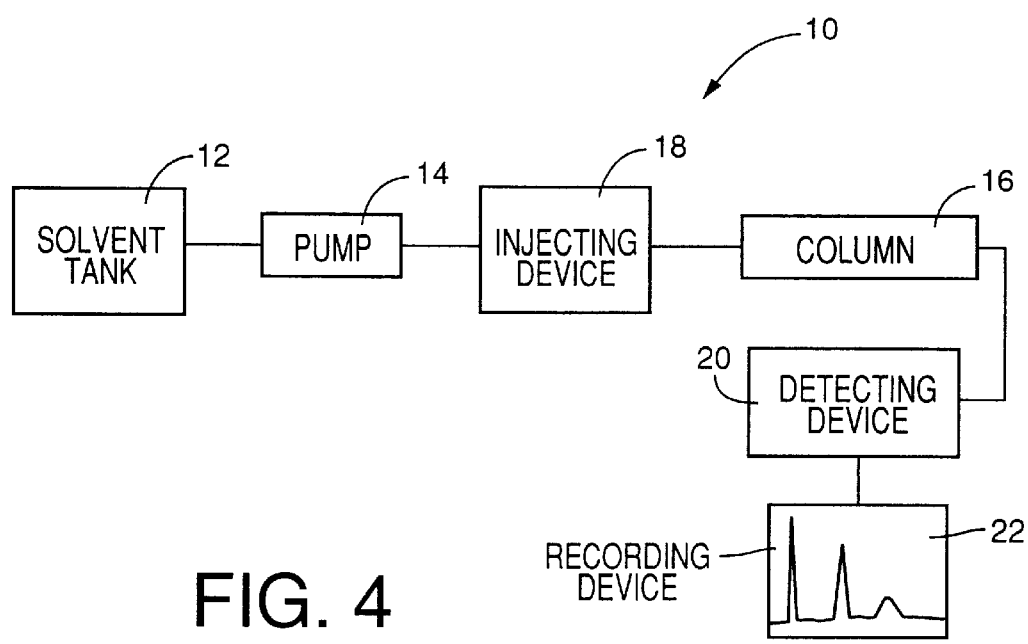
FIG. 4 is a diagrammatic view for illustrating the construction of a reversed phase chromatograph apparatus embodying the present invention.

In FIG. 4, a solvent tank 12 stores 100% of water as a mobile phase. An electric pump 14 introduces the water stored in the solvent tank 12, at a predetermined rate, e.g., 1.0 ml/min, into a column 16. An injecting device 18 including an injector (not shown) injects a sample dissolved in water, into the column 16.

The column 16 is formed of, e.g., a stainless tube. Since the present chromatograph apparatus 10 is for analyzing the sample, the column 16 has, e.g., a diameter of 4.6 mm and a length of 250 mm. An inner space of the column 16 is filled with a solid support which supports a stationary phase. The solid support is, e.g., silica (i.e., silica gel) which has pores whose size ranges from ten and several nm to several tens of nm. The solid support has, on an outer surface thereof, a silanol group to which the stationary phase is bonded.

The stationary phase comprises, as its main component, not less than 80wt % of triacontyl group that is a straight alkyl group having 30 carbon atoms, and not more than 20wt % of alkyl group or groups having 24 to 28 carbon atoms. After the stationary phase is bonded with the solid support, a silanol group which remains on the outer surface of the solid support, i.e., is not bonded with the stationary phase is treated with trimethylsilyl group, i.e., is bonded with trimethylsilyl group.

A detecting device 20 includes an ultraviolet ("UV") using detector for detecting one or more compounds from the sample. The sample containing the one or more compounds is injected from the injecting device 18 into the column 16, so that the compound or compounds is or are separated from the sample by the column 16 and is or are detected by the detecting device 20. A recording device 22 records the results produced from the detecting device 20.

Figure 5:
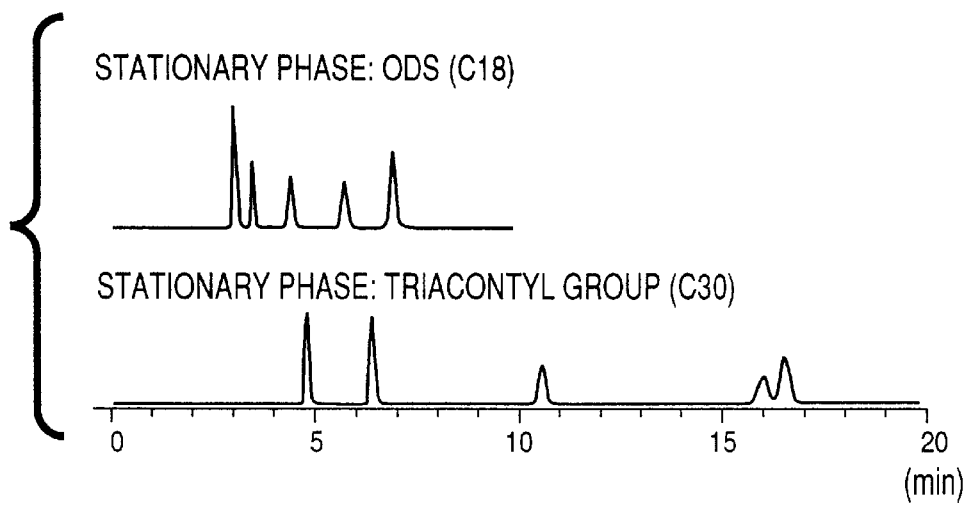
FIG. 5 shows, for comparison, a chromatogram which is obtained by the first conventional reversed phase chromatograph device of FIG. 1 in which the ODS is used as the stationary phase, and a chromatogram which is obtained by the invention reversed phase chromatograph apparatus of FIG. 4.

FIG. 5 shows, for comparison, a chromatogram which is obtained by a conventional reversed phase chromatograph device in which octadecyl group ("ODS") is used as the stationary phase, and a chromatogram which is obtained by the reversed phase chromatograph apparatus 10 in which triacontyl group is used as a main component of the stationary phase. The common conditions for the analysis are described in TABLE 1, below.

TABLE 1

| COLUMN | INNER DIAMETER | - 4.6 mm |
|---|---|---|
|  | LENGTH | - 250 mm |
| FLOW RATE | - 1.0 ml/min |  |
| DETECTION LIGHT | ULTRAVIOLET LIGHT | - 254 nm |
|  | (WAVELENGTH) |  |
| TEMPERATURE | - 40° C. |  |
| CONTENTS OF SAMPLE | CYTOSINE, URACIL, CYTIDINE, URIDINE, THYMINE |  |

FIG. 5 shows that the lower chromatogram obtained by the reversed phase chromatograph device 10 is different from the upper one obtained by the conventional device in which ODS is used as the stationary phase, in that intervals among peaks in the lower chromatogram are different from those in the upper one. Thus, the two chromatograms indicate that the two chromatograph devices have different specificities to the compounds contained in the sample. In addition, since the chromatograph apparatus 10 exhibits the greater compound-retention capacity, it is expected that the apparatus 10 can separate a compound which cannot be separated by the conventional device.

Figure 6:
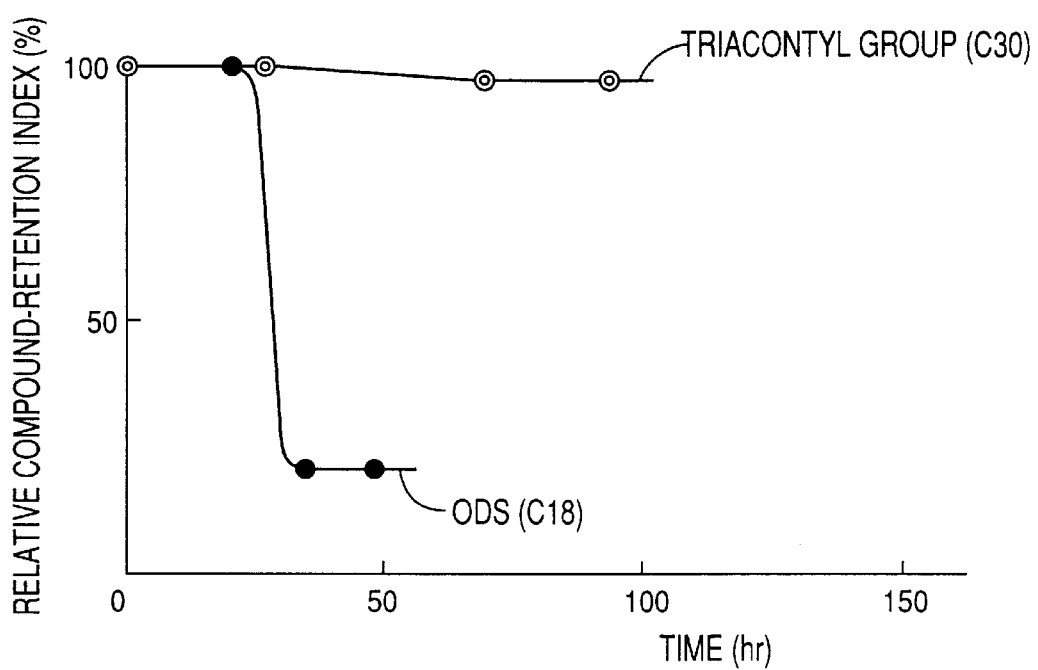
FIG. 6 is a graph showing, for comparison, a time-wise change of the compound-separate capability of the first conventional reversed phase chromatograph device in which 100% of water is used as the mobile phase, and no change of the compound-separate capability of the the invention reversed phase chromatograph device of FIG. 4 in which 100% of water is used as the mobile phase and triacontyl group is used as the stationary phase.

FIG. 6 is a graph showing, for comparison, a time-wise decrease of the compound-retention time of the conventional reversed phase chromatograph device, and no time-wise change of the compound-retention time of the reversed phase chromatograph device 10. The same conditions as employed in the above first test and specified in TABLE 1 are employed in this, second test. A vertical axis of the graph is indicative of relative compound-retention index that is the ratio (i.e., percentage) of a thymine-retention time of each of the two chromatograph devices at each of different times, to that at the time of beginning of the second test. Thymine (nucleic-acid base) is one of the compounds contained in the sample used in the above first test. FIG. 6 proves that if 100% of water is used as the mobile phase, the relative compound-retention index of the conventional device sharply decreases at about 30 hours later, but the relative compound-retention index of the chromatograph device 10 exhibits substantially no change.

Figure 7:
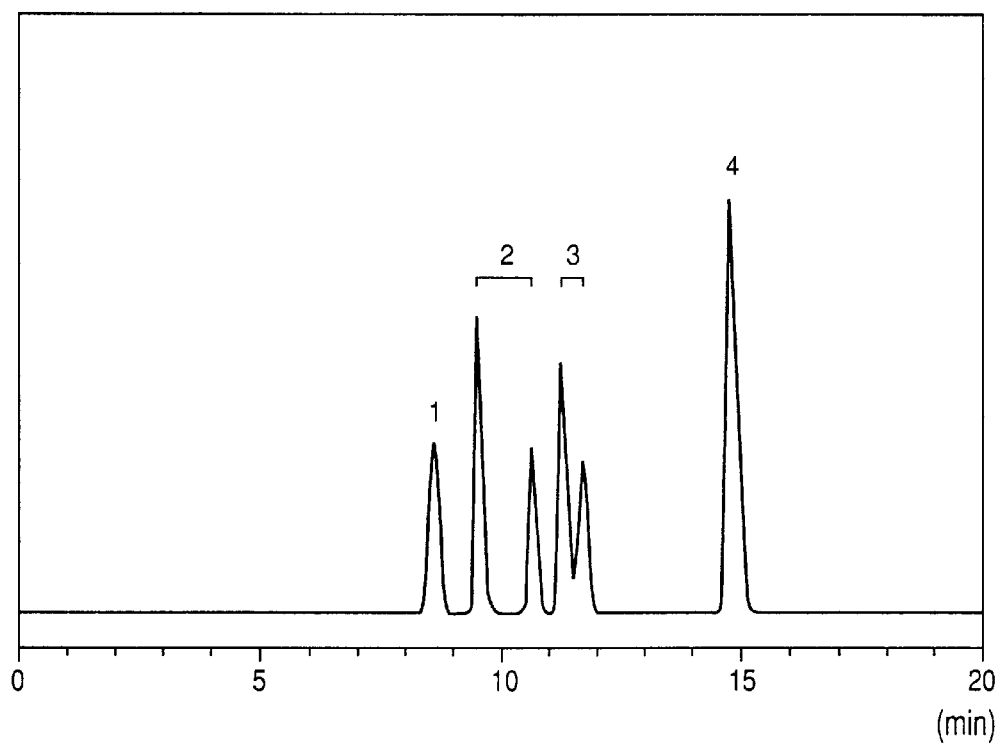
FIG. 7 shows a chromatogram which is obtained by a reversed phase chromatograph device as a second embodiment of the invention and which shows that different isomers are separated from each other.

FIG. 7 shows a chromatogram which is obtained by another reversed phase chromatograph device as a second embodiment of the invention in which the same stationary phase as used with the column 16 shown in FIG. 4 is used. The chromatogram shows that different isomers are separated from each other. The other conditions for the isolation are described in TABLE 2, below.

TABLE 2

| | |
|---|---|
| COLUMNS | 4.6 × 250 mm + 4.6 × 250 mm |
| MOVING PHASE | 100% of WATER |
| FLOW RATE | 0.7 ml/min |
| TEMPERATURE | 25° C. |
| DETECTION | RI (DIFFERENTIAL REFRACTOMETER) |
| CONTENTS OF SAMPLE | 1. GLUCOSE |
| | 2. LACTOSE |
| | 3. MALTOSE |
| | 4. SUCROSE |

The chromatogram of FIG. 7 shows that stereoisomers, lactose, maltose, and sucrose, are separated or identified from one another and that each of lactose and maltose is separated into two anomers.

Thus, the present invention provides a method of using, in a reversed phase chromatography, a stationary phase comprising, as its main component, triacontyl group having 30 carbon atoms, with a mobile phase consisting of 100% of water, and a reversed phase chromatograph apparatus 10 comprising the stationary phase and the mobile phase. According to the present invention, the compound-retention time of the stationary phase does not time-wise decrease, and the triacontyl group as the main component of the stationary phase has great hydrophobicity and steric selectivity that have not been available from a conventional stationary phase which is used with a mobile phase comprising water as its main component. Thus, the present chromatograph apparatus 10 or chromatograph method enjoys a great compound-retention ability or capacity, and accordingly can easily separate a certain compound from a sample, or separate different isomers from each other, though it has been impossible for the conventional device or method to do so.

It is speculated that the reason why the compound-retention time of the present chromatograph apparatus 10 or chromatograph method does not time-wise decrease is as follows: Generally, a compound having a greater number of carbon atoms has a higher melting point. For example, the melting point of octadecane ($C_{18}H_{38}$) having 18 carbon atoms is 29 or 30° C., whereas the melting point of triacontane ($C_{30}H_{62}$) having 30 carbon atoms is 67 or 68° C. At a temperature range of 30 to 50° C. at which a reversed phase chromatography is commonly performed, ODS (i.e., stearyl group) is near to the state of liquid and is considerably freely movable whereas the triacontyl group is present in the state of solid and is not freely movable. Therefore, the carbon chain of the triacontyl group does not lie on its side even though the mobile phase consisting of 100% of water may be used. Thus, the stationary phase is free from the problem of the time-wise decrease of the compound-retention time.

Since in the present embodiment the mobile phase consists of 100% of water, the mobile phase can be easily prepared.

In addition, in the present embodiment, after the stationary phase is bonded with the solid support filled in the column 16, the trimethylsilyl group is bonded with the active group which remains on the outer surface of the solid support. Therefore, the column 16 enjoys high life expectancy, and can be produced at low cost. Thus, the reversed phase chromatograph 10 enjoys low production cost.

While the present invention has been described in its preferred embodiment, the present invention may be otherwise embodied.

For example, in the illustrated embodiment, the stationary phase comprises, as its main component, triacontyl group that has 30 carbon atoms. However, the main component of the stationary phase may be one which has 24 to 40 carbon atoms, for example, tetracosyl group that has 24 carbon atoms, octacosyl group that has 28 carbon atoms, dotriacontyl group that has 32 carbon atoms, tetratriacontyl group that has 34 carbon atoms, hexatriacontyl group that has 36 carbon atoms, octatriacontyl group that has 38 carbon atoms, or tetracontyl group that has 40 carbon atoms.

In the illustrated embodiment, the stationary phase comprises not less than 80wt % of its main component (i.e., triacontyl group). However, the stationary phase may comprise not less than 60wt % of its main component.

In the illustrated embodiment, the stationary phase comprises, as its main component, a straight alkyl group. However, the stationary phase may comprise, as its main component, a branched alkyl group.

In the illustrated embodiment, the mobile phase consists of 100% of water. However, this is not essential. For example, the mobile phase may be provided by a solution comprising 99% (v/v) of water and 1% (v/v) of acetonitrile, or a solution comprising 97% (v/v) of water. According to the present invention, the mobile phase is only required to comprise water as its main component. In order to fix the pH of the mobile phase, or present the influence from the silanol group remaining on the outer surface of the solid support, the mobile phase may contain one or more of various known salts such as sodium phosphate, trifluoroacetic acid, triethylamine, or sodium perchlorate. In the illustrated embodiment, 100% of water used as the mobile phase, in fact, contains one or more salts. For example, sodium phosphate is added at the concentration of 100 to 200 mmol/l. However, even though one or more salts are added to the mobile phase, the volume of the mobile phase does not change so great. Therefore, the proportion of water contained in the mobile phase may be expressed with the added salt or salts being either included or excluded.

In the illustrated embodiment, the reversed phase chromatograph apparatus 10 and method are for analyzing the contents of a sample. However, the principle of the present invention may be applied to reversed phase chromatograph apparatus and method for collecting a certain compound from crude materials. In the latter case, the column 16 may be replaced with a column for collecting, e.g., having the diameter of 20 mm and the length of 250 mm.

It is to be understood that the present invention may be embodied with other changes, improvements, and modifications that may occur to a person skilled in the art without departing from the scope and spirit of the invention defined in the appended claims.

What is claimed is:

1. A method of using, in a reversed phase chromatography, a stationary phase comprising, per 100% by weight thereof, not less than 60% by weight of an alkyl group having not less than 30 carbon atoms, with a mobile phase comprising not less than 97% by volume of water.

2. A method, according to claim 1, wherein the alkyl group has from 30 to 40 carbon atoms.

3. A method according to claim 1, wherein the mobile phase consists essentially of water.

4. A method according to claim 1, further comprising a step of bonding trimethylsilyl group to an active group which remains on a surface of a solid support which supports the stationary phase, the active group being not bonded with the alkyl group of the stationary phase.

5. A method according to claim 1, wherein the stationary phase is used with the mobile phase in a temperature range of 30 to 50° C.

* * * * *